United States Patent Office 3,053,454
Patented Sept. 11, 1962

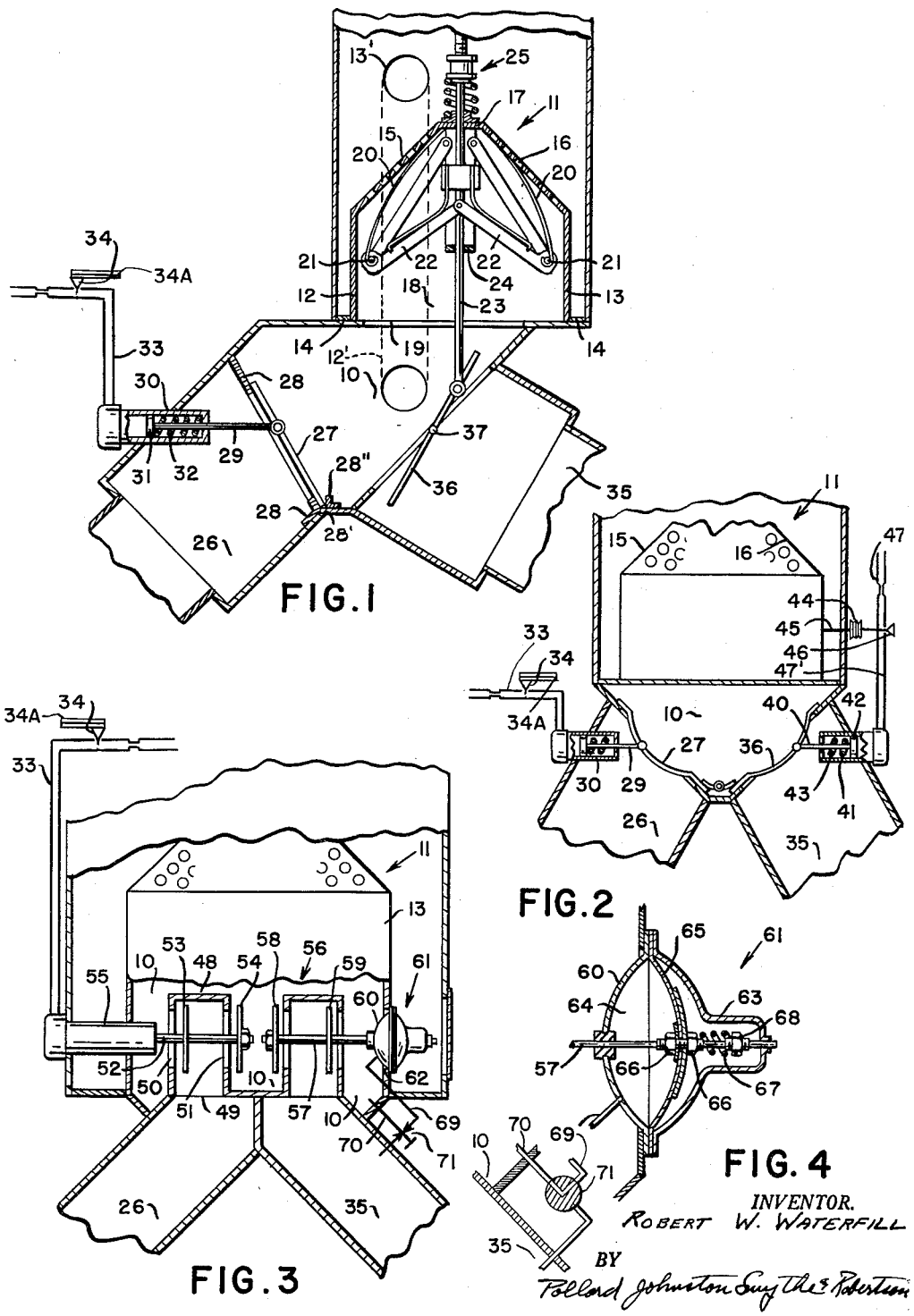

3,053,454
FLUID MIXER AND FLOW REGULATOR
Robert W. Waterfill, Montclair, N.J., assignor, by mesne assignments, to Buensod-Stacey Corporation, a corporation of Ohio
Filed Apr. 13, 1959, Ser. No. 805,765
15 Claims. (Cl. 236—13)

The present invention relates to fluid flow control devices and particularly to an arrangement for automatically regulating the flow of mixed warm and cold air from a mixing chamber to rooms or zones to be treated while at the same time, and responsive to a condition of the regulating arrangement, controlling the flow of warm and/or cold air to the mixing chamber.

It is well known that variations of fluid pressure in a fluid distribution line or duct may result in an inconstant or varying rate of flow. In air conditioning systems, particularly those employing a central air conditioning apparatus from which air is delivered to a plurality of individual distributing units, pressure variations in the air delivery line or ducts occur frequently by reason of the irregular and changing demand for air in the rooms or zones being conditioned. As an example, where dual duct systems are involved, particularly those operating at high pressures such as described in Patent No. 2,708,568, flow in the warm and cold air ducts may vary over wide ranges in response to demands, and such may result in wide variations in the pressure within the ducts. Variations in pressure within the ducts will cause objectionable changes in air distribution, noises, and other undesirable effects, unless the flow is controlled.

Various types of air flow or volume regulators have been employed in such systems in order to maintain substantially constant the rate of flow of air from a regulator to a room or zone being conditioned. Certain types of these flow control regulators involve the use of flexible curtain devices that are adapted to cooperate with rigid, perforated motion limiting means. The flexible curtain means is resiliently urged into a position for optimum flow conditions for a given requirement. In the event there occurs an increase or decrease in pressure, the flexible curtain means is moved into or away from the motion limiting means, thereby to limit variations in the flow of air through the perforated motion limiting means. This serves as a variable orifice means.

In devices of the above described type, temperature regulation was controlled by valves or dampers in the cold and/or hot air ducts which valves or dampers were operated by some means responsive to conditions prevailing within the room or zone being conditioned, but independently of the volume control regulator.

It has been found that controlling the flow of air to the mixing chamber through either the cold or warm air duct in response to the pressure within the chamber including the regulator while controlling the flow of air through the other duct leading to the mixing chamber in response to a condition prevailing within the room or zone to be conditioned minimizes the tendency of air bypass and otherwise contributes to better performance by tending to eliminate objectionable changes in air distribution, noises, and other undesirable effects incident to the operation of prior known systems of the type described.

One of the principal objects of this invention is to provide a flow control regulator that not only controls the volume flow of mixed air from a mixing chamber but also controls one of the flows of air to the mixing chamber in response to pressure within the mixing chamber.

Another object of the invention is to provide a dual acting air mixing and flow control means for dual duct systems.

Another object of this invention is to provide such an air mixing and flow control regulator that automatically limits the pressure build-up within the flow control regulator.

Still another object of the invention is to provide such a volume flow and pressure control regulator that is effective to limit pressure build-up within the regulator incident to the operation of the flow control function of the regulator.

Another object of the invention is to provide such a volume flow and pressure control regulator that is effective to limit pressure build-up within the regulator by pressure responsive means independent of the flow control function of the regulator.

Another object of this invention is to limit the pressure variation within the mixing chamber, so that a fixed opening from the mixing chamber may be used to increase the capacity of the control device, by bypassing the flow control element.

Another object of this invention is to provide a mixing chamber adapted to handle large volumes of air and in which the pressure variation therein is limited by the action of a flow control regulator of small capacity relatively to the volume of air handled by the mixing chamber.

Another object of the invention is to provide such a volume flow and pressure control regulator which is effective to limit the pressure build-up within the regulator by pressure responsive means independent of the flow control function of the regulator, and in which said apparatus is a self-contained unit in which pressure fluid in one of the air ducts may be employed to shut off the flow of air through that duct to the mixing chamber containing the regulator.

While the present invention can be employed in conjunction with low pressure systems, it is particularly useful when it is employed with high pressure arrangements. It can be used as described hereinafter in conjunction with high pressure systems in which the size of the ducts leading to the volume regulators have a maximum diameter of about four inches to twenty inches, or the equivalent, the pressure at the unit being variable and about two to eight inches of water static pressure and the potential velocity of air in the ducts being between about 1500 and 5000 feet per minute, although these values may vary slightly from what is given in what is known as a high pressure system.

In one aspect of the invention, a mixing chamber may be provided with hot and cold air ducts leading to it and a mixed air duct leading from it. Flow control valves or dampers may be located within the warm and cold air ducts leading to the mixing chamber, and a flow control regulator may be provided within the mixing chamber to control the flow of mixed air through the duct leading from the mixing chamber and for limiting the pressure within the mixing chamber.

The flow control regulator may be of the pressure responsive type including a housing having a variable orifice means which may take the form of perforated walls and flexible curtain means adapted normally to be held away from the perforated walls, permitting optimum air flow therethrough. Increase of pressure fluid within the regulator on the upstream side of the curtain means causes movement of the latter into cooperating position with the perforated walls thereby varying the effectiveness of the variable orifice means and limiting the pressure within the mixing chamber.

In another aspect of the invention, the motion of the curtain means may reciprocate a rod, the movement of which may be employed to operate one of the valves or dampers within the warm or the cold air ducts leading to the mixing chamber, while the other valve or damper may be operated by means responsive to a condition such as the temperature prevailing in the room or zone to which the mixed air duct leads.

In another aspect of the invention, the pressure responsive flow control valve or damper within one of the ducts leading to the mixing chamber may be operated by a fluid motor and a separate source of pressure fluid from that within the system. To this end, a bellows connected to the interior of the mixing chamber may operate a needle valve for controlling the flow of pressure fluid to the fluid motor.

In another aspect of the invention, the mixing chamber may be provided with a fixed bypass around the pressure responsive volume control regulator, and the pressure within the mixing chamber and the bypass may be limited by employing a curtain type pressure responsive flow control regulator of a much smaller capacity than the capacity of the system.

In still another aspect of the invention, a diaphragm operated motor could be arranged in communication with the mixing chamber so as to control the valve or damper within one of the ducts leading to the mixing chamber, and a line leading from a point upstream within said duct could be employed to pass fluid pressure onto the diaphragm to positively close it when desired.

The above, other objects and novel features of the new and improved dual flow control device will become apparent from the following specification and accompanying drawings which are merely exemplary.

In the drawing:

FIG. 1 is a portion of an air conditioning system to which the principles of the invention have been applied;

FIG. 2 is a modified form of the invention shown in FIG. 1;

FIG. 3 is another modified form of the invention shown in FIG. 1; and

FIG. 4 is an enlarged view of a detail of the apparatus shown in FIG. 3.

Referring to the drawings, and particularly to FIG. 1, the principles of the invention are shown as applied to an air conditioning system including a mixing chamber 10 which may be made of sheet metal or other suitable housing material. Within the chamber 10 may be located a pressure responsive flow control regulator 11. A bypass 12' may extend from the chamber 10 to a point 13' downstream from the regulator 11. The regulator 11 may include side walls 12 and 13 and pitched portions 15 and 16 which approach each other at a crown 17.

The pitched wall portions 15 and 16 may be provided with fluid passage means therethrough, and flexible curtain means 20 forming a variable orifice means. The curtain means 20 may be pivotally mounted at the crown 17 of housing 11, and the free ends thereof may be connected to bars 21 at the end of rods 22 which latter are pivoted to a vertically reciprocable rod 23 extending upwardly through the crown 17 of housing 11 and downwardly through a bearing within a plate 24 running lengthwise of housing 11 and fixed thereto beneath the crown 17. With this arrangement, the regulator 11 may be used to control the pressure within the mixing chamber, and one relatively small regulator 11 may control a large volume of air by maintaining a fixed pressure within the fixed bypass 12'.

The portion of the rod 23 that extends above the crown 17 may be threaded to receive a spring and nut construction 25 for applying a predetermined force tending to raise rod 23 to thereby collapse the flexible curtain means 20 and permit a maximum flow of fluid through the pitched wall portions 15 and 16. Increase in the pressure within the mixing chamber 10 causes the curtain means 20 to move outwardly more or less to reduce the effectiveness of the passage means within the pitched wall portions 15 and 16, and, conversely, reduction of pressure within the chamber 10 causes raising of the rod 23 thereby to collapse the curtain means 20, causing more fluid to flow past the wall portions 15 and 16.

The above described regulator is substantially the same as that shown, described and claimed in U.S. Patent 2,890,716 granted June 16, 1959, in the name of Ernest A. Werder, to which patent attention is directed for details of construction not specifically described herein.

In order to supply warm and cold air to the mixing chamber 10, a cold air duct 26 may lead from a cold air supply and be connected to the mixing chamber 10 in the usual manner. A flow control valve or damper 27 of any type may be mounted within the duct 26 for controlling the flow of cold air to the chamber 10. Operation of this valve may be manual or automatic. In the embodiment disclosed, the valve 27 is shown as an oscillatable type of valve having a seat 28 that is adapted to cooperate with a mating seat at the junction of duct 26 with chamber 10, and a pivot point 28' formed by a bracket 28''.

The valve 27 may be connected to a piston rod 29 that extends into a cylinder 30 of a fluid motor. A piston 31 may be connected to rod 29 and a spring 32 may normally urge the valve 27 into closed position. A pressure fluid line 33 from a source which may be separate from the fluid within the system may include a needle valve 34 for controlling the flow of pressure fluid to the cylinder 30. The valve 34 may be of the temperature-responsive type that may be controlled by a bimetallic thermostat 34A located within the room or zone being conditioned. Accordingly, as the temperature in the room or zone rises, the valve may be closed to cause air pressure to build up in the cylinder 30, thereby opening valve 27 and increasing the supply of cold air to the system. As the temperature of the room or zone falls, the valve 34 may open, thereby causing closing of the valve 27. Obviously, other types of bleed-off controlling means can be used.

A warm air duct 35 may be connected to the mixing chamber 10 in a usual manner, and it may include a flow control valve or damper 36 which may be of any type but is shown as pivotally mounted at 37.

The lower end of the regulator rod 23 may be connected to the valve 36 for operating it in response to pressure fluctuation beneath the curtains 20. Accordingly, any substantial increase in the pressure beneath the curtains 20 will cause them progressively to cover and block the passage of air through more and more of the perforations in the walls 15 and 16. This action causes lowering of rod 23 and consequently throttling of the valve 36, thereby reducing the supply of air from duct 35 and consequently reducing the pressure beneath curtains 20. A drop in pressure beneath curtains 20 causes a reverse action to occur.

From the foregoing it is evident that a dual acting flow regulator has been provided which cooperates with valve or damper means for controlling air flow to a mixing chamber to maintain a substantially constant flow of mixed air at a predetermined pressure and temperature to a room or zone to be conditioned. Furthermore, the inherent pressure responsive characteristics of the regulator are employed to control any pressure variations within it.

Referring to FIG. 2, the principles of the invention are shown as applied to an air conditioning system similar to that shown in FIG. 1, but in which the pressure responsive means for preventing pressure build-up within the flow regulator in the mixing chamber is independent of the curtain actuating means.

In the embodiment of FIG. 2, the valve 36 is mounted similarly to that of valve 27, and it is connected to a piston rod 40 that may extend into a cylinder 41. A piston 42 within cylinder 41 may be connected to the rod 40, and a spring 43 within cylinder 41 may normally urge piston 42 rightwardly, thereby closing valve 36. A bellows 44 may be connected to the interior of the regulator housing 11 by a line 45. The opposite end of bellows 44 from that connected to line 45 may be fixed to a needle valve 46 for controlling the pressure from a source 47 leading to the cylinder 41. Accordingly, as the pressure within the regulator housing 11 builds up, needle valve 46 may be operated to decrease pressure in cylinder 41 thereby causing valve 36 to be throttled, thus reducing the supply of air from the duct 35 to the mixing chamber 10 and consequently reducing the pressure within the regulator housing 11 beneath the flexible curtain means 20.

Referring to FIG. 3, the principles of the invention have been shown as applied to an air conditioning system wherein a self-contained apparatus is employed requiring no outside source of power for operating the pressure responsive means for preventing a build-up of pressure within the regulator housing 11.

In the embodiment shown in FIG. 3, the mixing chamber is provided with a modified form of valve including a housing 48 opening to the duct 26 through a passage 49. Aligned openings 50 and 51 lead from housing 48 to the mixing chamber 10. A rod 52 may support spaced valve or damper discs 53 and 54 for closing the aligned openings 50 and 51 within housing 48. A motor 55 similar to the motor including cylinder 30 of FIG. 1 may be employed to actuate the rod 52 to control the flow of air to the mixing chamber 10 in response to a condition within the room or zone to be conditioned.

A similar valve 56 is provided within the mixing chamber 10 and it may include a rod 57 for supporting discs 58 and 59 for interrupting communication between duct 35 and mixing chamber 10. The rod 57 may extend through a slide bearing within the wall 60 of a diaphragm motor 61, which wall 60 is mounted within an opening 62 in the wall 13 of the regulator housing 11. Referring to FIG. 4, the motor 61 may include an outer housing 63 that is fixed to the wall 60, forming a chamber 64 therebetween. A flexible diaphragm 65 may be mounted between the rims of the wall 60 and housing 63, and it may divide the chamber 64 into two compartments.

The rod 57 may extend through the center of the diaphragm 65 and be fixed thereto by rigid plates on each side thereof held by nuts 66. The end of rod 67 within housing 63 may be threaded for receiving a spring 67 and an adjusting nut 68 to produce a predetermined force urging diaphragm 65 leftwardly and hence valve discs 58 and 59 to an open position.

A line 69 may be connected to wall 60 of diaphragm motor 61 and may extend to duct 35 for establishing communication between duct 35 and the chamber 64 for a purpose to be described later. A line 70 may extend from line 69 to the interior of mixing chamber 10, and a three-way valve 71 may be provided at the juncture of lines 69 and 70. With valve 71 set in one position, communication is established between the mixing chamber 10 and the chamber 64. Accordingly, with valve 71 in this position, any increase in pressure within the housing 11 will cause diaphragm 65 to move rightwardly, moving valve discs 58 and 59 toward a closed position to thereby reduce the pressure within regulator housing 11.

When it is desired to shut off the flow of air from duct 35 to the mixing chamber 10 by means of valve discs 58, 59, the valve 71 may be operated to interrupt communication between mixing chamber 10 and chamber 64 and to establish communication between duct 35 and chamber 64 through line 69.

It is to be understood that the embodiments of FIGS. 2 and 3 may also include a fixed bypass such as that shown in FIG. 1, so that a small flow control regulator may be employed to control the flow of a large volume of air as explained in connection with the description of FIG. 1. Also, several ducts can lead from the mixing chamber, in only one of which is located the volume regulator. In this manner, the flow through all of the outlet ducts can be controlled by a relatively small regulator.

Although the various features of the new and improved air conditioning regulator device have been shown and described in detail to fully disclose several embodiments of the invention, it will be evident that numerous changes may be made in such details, and certain features may be used without others without departing from the principles of the invention.

What is claimed is:

1. In an air conditioning system, a mixing chamber; separate warm and cold air ducts leading to said mixing chamber; valves adjacent the inlets from said ducts to said mixing chamber; room or zone condition responsive means for controlling the valve associated with one of said ducts; a flow control device within said mixing chamber responsive to pressure therein, on the upstream side thereof, for maintaining substantially constant the flow of air through said flow control device; duct means leading from said mixing chamber and bypassing said flow control device; and means responsive to the pressure within said flow control device for controlling the operation of the valve associated with said other duct.

2. In an air conditioning system, a mixing chamber; separate warm and cold air ducts leading to said mixing chamber; valves adjacent the inlets from said ducts to said mixing chamber; room or zone condition responsive means for controlling the valve associated with one of said ducts; a flow control device within said mixing chamber comprising swingable flexible means; motion limiting means for said flexible means, said limiting means including air passage means therethrough, said flexible means and limiting means cooperating with each other to control the flow of fluid through said limiting means; duct means leading from said mixing chamber and bypassing said flow control device; and means responsive to the pressure within said flow control device for controlling the operation of the valve associated with said other duct.

3. In an air conditioning system, a mixing chamber; separate warm and cold air ducts leading to said mixing chamber; valves adjacent the inlets from said ducts to said mixing chamber; room or zone condition responsive means for controlling the valve associated with one of said ducts; a flow control device within said mixing chamber comprising a pair of swingable flexible means; motion limiting means for each of said flexible means, each of said limiting means having air passage means therethrough, said flexible means and limiting means cooperating with each other to control the flow of air through said limiting means; duct means leading from said mixing chamber and bypassing said flow control device; and means responsive to the pressure within said flow control device for controlling the operation of the valve associated with said other duct.

4. In an air conditioning system, a mixing chamber; separate warm and cold air ducts leading to said mixing chamber; valves adjacent the inlets from said ducts to said mixing chamber; room or zone condition responsive means for controlling the valve associated with one of said ducts; a flow control device within said mixing chamber comprising swingable flexbile curtain means; motion limiting means for said curtain means, said limiting means having air passage means therethrough, said curtain and limiting means cooperating to control air flow therethrough; swingable movement stabilizing arm means connected to said curtain means, said arm means being swingable about a hinge axis for guiding the swinging action of said curtain means; reciprocable rod means connected to said arm means; resilient means for urging said rod and arm means in a direction to open the air passage means in said limiting means; duct means leading from said mixing chamber and bypassing said flow control device; and means responsive to the pressure within said flow control device for controlling the operation of the valve associated with said other duct.

5. In an air conditioning system, a mixing chamber; separate warm and cold air ducts leading to said mixing chamber; valves adjacent the inlets from said ducts to said mixing chamber; room or zone condition responsive means for controlling the valve associated with one of said ducts; a flow control device within said mixing chamber comprising swingable flexible curtain means; motion limiting means for said curtain means, said limiting means having air passage means therethrough, said curtain and limiting means cooperating to control air flow therethrough; swingable movement stabilizing arm means connected to said curtain means, said arm means being swingable about a hinge axis for guiding the swinging action of said curtain means; reciprocable rod means connected to said arm means; resilient means for urging said rod and arm means in a direction to open the air passage means in said limiting means; and means connecting said reciprocable rod to the valve associated with said other duct for operating said valve in relation to the operation of said flexible curtain means.

6. In an air conditioning system, a mixing chamber; separate warm and cold air ducts leading to said mixing chamber; valves adjacent the inlets from said ducts to said mixing chamber; room or zone condition responsive means for controlling the valve associated with one of said ducts; fluid operated motor means for controlling the operation of the valve associated with said other duct; a flow control device within said mixing chamber comprising swingable flexible means; motion limiting means for said flexible means, said limiting means including air passage means therethrough, said flexible means and limiting means cooperating with each other to control the flow of fluid through said limiting means; duct means leading from said mixing chamber and bypassing said flow control device; and expansible means in pressure communication with said mixing chamber for controlling the flow of fluid to said fluid operated motor means.

7. In an air conditioning system, a mixing chamber; separate warm and cold air ducts leading to said mixing chamber; valves adjacent the inlets from said ducts to said mixing chamber; room or zone condition responsive means for controlling the valve associated with one of said ducts; fluid operated motor means for controlling the operation of the valve associated with said other duct; a flow control device within said mixing chamber comprising flexible curtain means adapted to swing about an axis; motion limiting means for said curtain means against which said curtain means rolls, said limiting means having air passage means therethrough and cooperating with said curtain means to control flow of air; and bellows means in a line leading from said mixing chamber for controlling the flow of fluid to said fluid operated motor means.

8. In an air conditioning system, a mixing chamber; separate warm and cold air ducts leading to said mixing chamber; valves adjacent the inlets from said ducts to said mixing chamber; room or zone condition responsive means for controlling the valve associated with one of said ducts; fluid operated motor means for controlling the operation of the valve associated with said other duct; a flow control device within said mixing chamber comprising a pair of swingable flexible means; motion limiting means for each of said flexible means, each of said limiting means having air passage means therethrough, said flexible means and limiting means cooperating with each other to control the flow of air through said limiting means; and bellows means in a line leading from said mixing chamber for controlling the flow of fluid to said fluid operated motor means.

9. In an air conditioning system, a mixing chamber; separate warm and cold air ducts leading to said mixing chamber; valves adjacent the inlets from said ducts to said mixing chamber; room or zone condition responsive means for controlling the valve associated with one of said ducts; a flow control device within said mixing chamber responsive to pressure therein, on the upstream side thereof, for maintaining substantially constant the flow of air through said flow control device; duct means leading from said mixing chamber and bypassing said flow control device; and diaphragm motor means responsive to the pressure within said mixing chamber for controlling the operation of the valve associated with said other duct.

10. In an air conditioning system, a mixing chamber; separate warm and cold air ducts leading to said mixing chamber; valves adjacent the inlets from said ducts to said mixing chamber; room or zone condition responsive means for controlling the valve associated with one of said ducts; a flow control device within said mixing chamber responsive to pressure therein, on the upstream side thereof, for maintaining substantially constant the flow of air through said flow control device; diaphragm motor means connected to the valve associated with said other duct; a line connecting said diaphragm motor means to the interior of said mixing chamber; a branch line connecting said other duct to said diaphragm motor means; and valve means between said diaphragm motor means and both of said lines, whereby said diaphragm motor means can be connected to said mixing chamber or to said other duct.

11. In an air conditioning system, a mixing chamber; separate warm and cold air ducts leading to said mixing chamber; valves adjacent the inlets from said ducts to said mixing chamber; room or zone condition responsive means for controlling the valve associated with one of said ducts; a flow control device within said mixing chamber comprising swingable flexible means; motion limiting means of said flexible means, said limiting means including air passage means therethrough, said flexible means and limiting means cooperating with each other to control the flow of fluid through said limiting means; diaphragm motor means connected to the valve associated with said other duct; a line connecting said diaphragm motor means to the interior of said mixing chamber; and valve means within said line for establishing and interrupting communication between said diaphragm motor means and said mixing chamber.

12. In an air conditioning system, a mixing chamber; separate warm and cold air ducts leading to said mixing chamber; valves adjacent the inlets from said ducts to said mixing chamber; room or zone condition responsive means for controlling the valve associated with one of said ducts; a flow control device within said mixing chamber comprising flexible curtain means adapted to swing about an axis; motion limiting means for said curtain means against which said curtain means rolls, said limiting means having air passage means therethrough and cooperating with said curtain means to control flow of air; diaphragm motor means connected to the valve associated with said other duct; a line connecting said diaphragm motor means to the interior of said mixing chamber; a branch line connecting said other duct to said diaphragm means; and valve means between said diaphragm motor means and both of said lines, whereby said diaphragm motor means can be connected to said mixing chamber or to said other duct.

13. In an air conditioning system, a mixing chamber; separate warm and cold air ducts leading to said mixing chamber; valves adjacent the inlets from said ducts to said mixing chamber; a flow control device within said mixing chamber responsive to pressure therein; duct means leading from said mixing chamber and bypassing said flow control device; variable orifice means responsive to the pressure within said flow control device for controlling the operation of one of said valves; and room or zone condition responsive means for controlling said other valve.

14. In an air conditioning system for a room or zone, a mixing chamber; separate warm and cold air ducts leading to said mixing chamber; valves adjacent the inlets from said ducts to said mixing chamber; a flow control device within said mixing chamber having a capacity substantially less than the capacity of said system; bypass means around said flow control device; means responsive to a condition within the room or zone being conditioned for controlling one of said valves; and means for maintaining a substantially constant pressure within said mixing chamber and said bypass by controlling the other of said valves.

15. In an air conditioning system for a room or zone, a mixing chamber; separate warm and cold air ducts leading to said mixing chamber; valves adjacent the inlets from said ducts to said mixing chamber; a flow control device within said mixing chamber having a capacity substantially less than the capacity of said system; bypass means around said flow control device; means responsive to a condition within the room or zone being conditioned for controlling one of said valves; and means for maintaining a substantially constant pressure within said mixing chamber and said bypass including means responsive to operation of said flow control device by controlling the other of said valves.

References Cited in the file of this patent

UNITED STATES PATENTS

| | | |
|---|---|---|
| 699,352 | Titus | May 6, 1902 |
| 2,508,074 | Miller | May 16, 1950 |
| 2,793,812 | McDonald | May 28, 1957 |
| 2,828,076 | Donahue | Mar. 25, 1958 |
| 2,890,716 | Werder | June 16, 1959 |